United States Patent Office 3,159,540
Patented Dec. 1, 1964

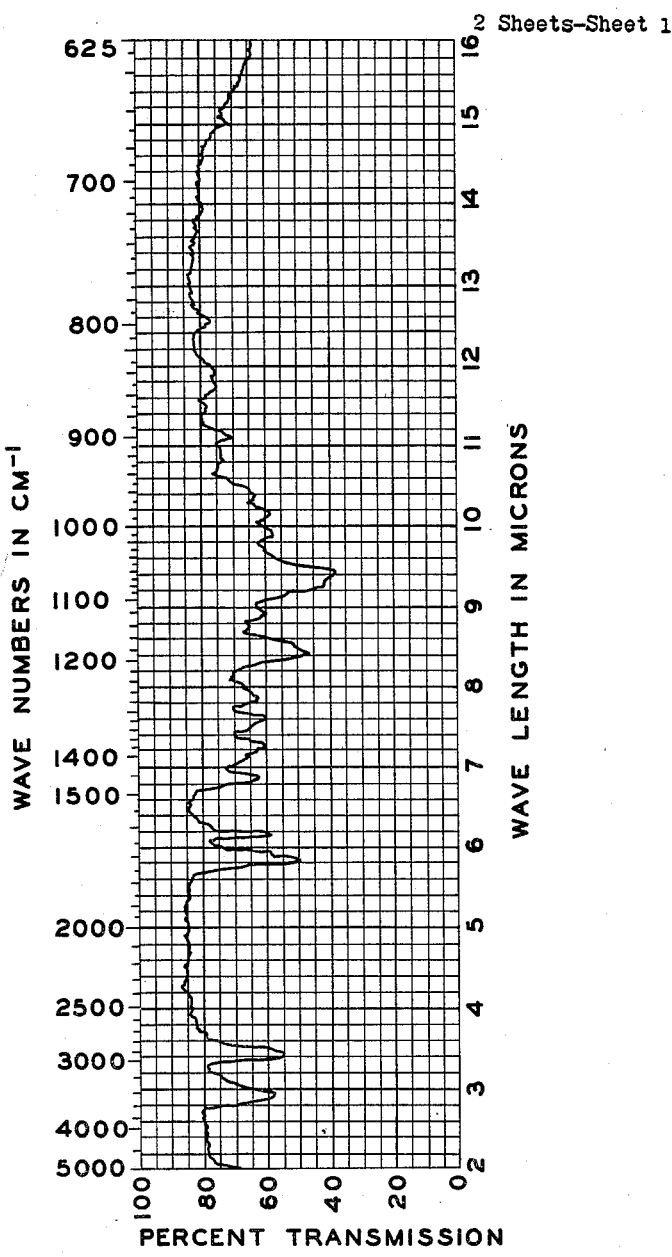

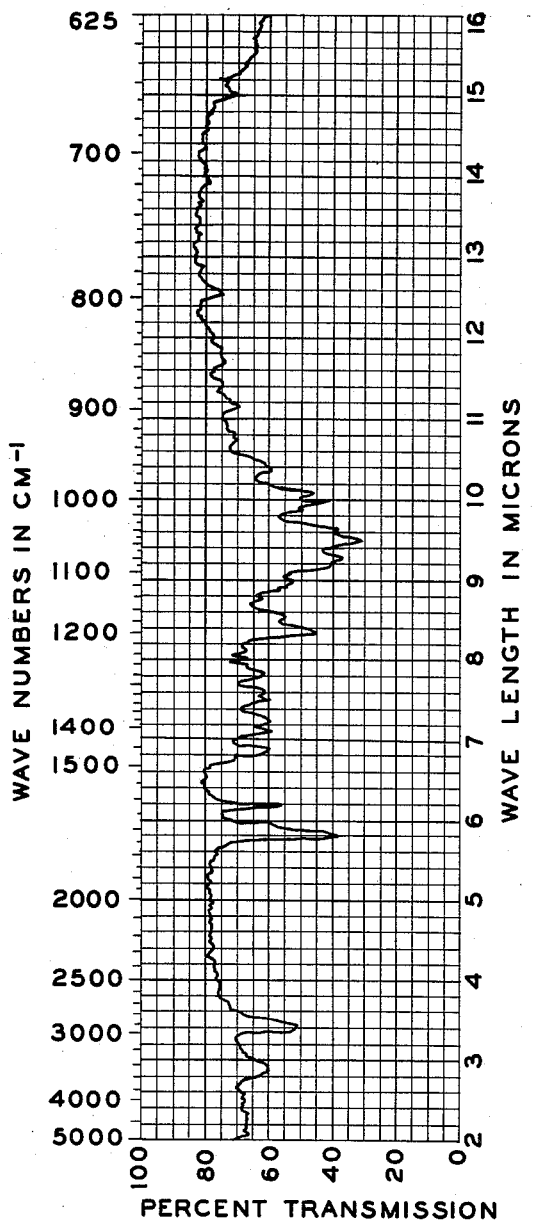

3,159,540
ANTIBIOTIC CIRRAMYCIN AND ITS PRODUCTION
Hiroshi Kawaguchi, Hideo Koshiyama, and Masanori Okanishi, Tokyo, Japan, assignors to Bristol-Banyu Research Institute, Ltd., Tokyo, Japan, a Japanese corporation
Filed July 3, 1962, Ser. No. 207,315
10 Claims. (Cl. 167—65)

This invention relates to a new and useful substance called cirramycin and to processes for its production. More particularly, it relates to processes for its production by fermentation and methods for its recovery and purification. The invention embraces this antibacterial agent and its acid addition salts in dilute solutions, as crude concentrates, as purified solids and in pure crystalline forms. Cirramycin is effective in inhibiting the growth of Gram-positive bacteria. Cirramycin is non-toxic and exhibits a therapeutic effect on mice infected with Gram-positive bacteria. Cirramycin belongs to the macrolide group of antibiotics.

Cirramycin contains two components, cirramycin A and cirramycin B, which were separated by countercurrent distribution. Thus use of the term cirramycin refers to the mixture of A and B components, usually in approximately equal amounts. The present invention includes not only cirramycin but also the individual constituents cirramycin A and cirramycin B and mixtures thereof.

There is now provided, according to the present invention, an antibiotic substance effective in inhibiting the growth of Gram-positive bacteria which is selected from the group consisting of a basic substance, cirramycin A, which is soluble in methanol, ethanol, butanol, ethyl acetate, butyl acetate, chloroform, acetone, diethyl ether and benzene and slightly soluble in water and insoluble in petroleum ether and capable of forming salts with acids, which gives positive Fehling, Tollens and Molisch reactions, a positive orcinol reaction and negative biuret, ninhydrin and ferric chloride reactions, and which in purified form melts at 123–124° C., exhibits $[\alpha]_D^{20}$ of —20° (c.=1.0, $CHCl_3$), exhibits in ethanol an ultraviolet absorption spectrum having a maximum at 240 m$\mu$, $$E_{1\,cm}^{1\%} \text{ at } 240 \text{ millimicrons} = 268$$

has the following average elemental analysis: C, 64.04%; H, 9.02%; N, 2.75% and O (by difference) 24.19%; and when pelleted in potassium bromide exhibits characteristic absorption in the infra-red region of the spectrum as shown in FIGURE 1; and acid addition salts of said basic substance, and a basic substance, cirramycin B, which is soluble in methanol, ethanol, butanol, ethyl acetate, butyl acetate, chloroform, acetone, diethyl ether and benzene and slightly soluble in water and insoluble in petroleum ether and capable of forming salts with acids, which gives positive Fehling, Tollens and Molisch reactions, a negative orcinol reaction and negative biuret, ninhydrin and ferric chloride reactions, and which in purified form melts at 228–229° C., exhibits $[\alpha]_D^{20}$ of —61° (c.=1.0, $CHCl_3$), exhibits in ethanol an ultraviolet absorption spectra having a maximum at 240 m$\mu$, $$E_{1\,cm}^{1\%} \text{ at } 240 \text{ millimicrons} = 365$$

has the following average elemental analysis: C, 61.49%; H, 8.50%; N, 2.01%; and O (by difference) 28.00%; and when pelleted in potassium bromide exhibits characteristic absorption in the infra-red region of the spectrum as shown in FIGURE 2; and acid addition salts of said basic substance.

Referring to the drawings:
FIGURE 1 is a curve of the infra-red absorption spectrum of cirramycin A free base when pelleted in potassium bromide.
FIGURE 2 is a curve of the infra-red absorption spectrum of cirramycin B free base when pelleted in potassium bromide.

There is further provided, according to the present invention, the process for the production of an antibiotic substance, designated cirramycin, which comprises cultivating a strain of *Streptomyces cirratus* in an aqueous carbohydrate solution containing a nitrogenous nutrient under submerged aerobic conditions until substantial activity versus Gram-positive bacteria is imparted to said solution and then recovering said cirramycin from said solution.

The organism producing the antibiotic of the present invention was isolated from a sample of soil and is a new species, designated *Streptomyces cirratus*, of the genus Streptomyces. A culture of the living organism, given the laboratory designation No. 12090, has been deposited in the American Type Culture Collection, Washington, D.C., and added to its permanent collection of microorganisms as A.T.C.C. 14699.

The representative strain, No. 12090, of *S. cirratus* has the following characteristics:

(1) The aerial mycelium produces curling sporophores or occasionally loops. Structure of spore surface observed by electron microscope is smooth.

(2) Czapek's agar: The growth is scant and colorless, and no aerial mycelium and no soluble pigment are produced.

(3) Glycerin Czapek's agar: The growth is moderate and pale yellow. The aerial mycelium is velvety and white to brownish white and no soluble pigment is produced.

(4) Calcium malate agar: The growth is poor and colorless, velvety white aerial mycelium is scant and no soluble pigment is found.

(5) Glucose asparagine agar: The growth is moderate and pale yellow to pale yellowish brown. White to pale brown aerial mycelium is moderate and velvety, and no soluble pigment is produced.

(6) Bennett's agar: The growth is moderate and pale yellowish brown to camel. The aerial mycelium is moderate, velvety and white to brownish gray through brownish white, and pale yellowish brown soluble pigment is produced.

(7) Nutrient agar: Pale yellowish brown growth is moderate and glossy, and no aerial mycelium and no soluble pigment is produced.

(8) Potato plug: Yellowish brown growth is moderate and glossy, and no aerial mycelium and grayish yellow brown soluble pigment is observed.

(9) Starch agar: The growth is moderate and yellowish gray, and velvety aerial mycelium is light brownish gray to old ivory, and no soluble pigment is produced. Starch hydrolysis is moderately strong.

(10) Gelatin stab: The growth is pale yellowish colony on the surface. Aerial mycelium is none and pale yellowish brown soluble pigment is formed. Liquefaction is negative.

(11) Bouillon gelatin stab: The growth is pale yellowish brown and it forms sediment. No aerial mycelium and pale yellowish brown soluble pigment is observed. Liquefaction is positive.

(12) Cellulose agar: No growth is observed.

(13) Milk: The growth is yellowish and ring form, and no aerial mycelium and no soluble pigment is produced. Milk is very slowly digested after 3 weeks without coagulation and it becomes faintly alkaline.

(14) Nitrate solution: The growth is a pale yellowish pellet mass which makes sedimentation. No aerial mycelium and no soluble pigment is formed. Reduction of nitrate to nitrite is negative.

(15) Whole egg: The growth is good and grayish yellow brown to dark yellowish brown, and brownish white aerial mycelium is good and velvety. Dark brown pigment is formed.

(16) Melanine formation media: The growth is glossy and colorless, white aerial mycelium is scant and velvety, and melanine is not formed.

(17) Carbon sources utilization was tested by the method of Pridham and the following results were obtained: Good utilization was observed with arabinose, xylose, glucose, galactose, fructose, cellobiose, maltose and salicin. Utilization of sodium succinate is fair, and sorbose, lactose, sucrose, raffinose, inuline, inositol, mannitol, sorbitol, rhamnose and sodium citrate were doubtful or negative.

Streptomyces cirratus (strain No. 12090) has a brownish gray aerial mycelium and produces a faint brown pigment on some organic media. Gelatin liquefaction is positive on a bouillon gelatin stab but negative on a gelatin stab. Nitrite is not produced from nitrate. Starch is hydrolyzed and milk is slowly digested with slightly alkaline reaction. S. cirratus (strain No. 12090) resembles S. lydicus, S. pseudogriseolus, S. griseoplanus and S. sp., producer of telomycin, in respect to morphology and color of the aerial mycelium and soluble pigment, but some distinct differences are found in cultural characteristics as well as in biochemical properties. Some of these differences are listed below:

S. lydicus: The color of aerial mycelium is reported to be white on Czapek's and white to pink to gray on starch agar. Formation of nitrite from nitrate is positive and starch hydrolysis is good to excellent.

S. pseudogriseolus: Differences are found in biochemical properties, such as strong reduction of nitrate, coagulation and peptonization on milk, digestion and weak to moderate liquefaction on gelatin stab. Differences are also found on utilization of carbon sources such as inositol, lactose, mannitol, rhamnose and sucrose.

S. griseoplanus: This species bears scant aerial mycelium on both Czapek's and starch agar and none on glucose asparagine agar. Hydrolysis is slight on starch agar. Differences on utilization of carbon sources are also found in the case of lactose, raffinose, fructose and sucrose.

S. sp., producer of telomycin: No aerial mycelium and soluble pigment is found on glucose asparagine agar. Gray aerial mycelium is observed both on calcium malate agar and potato plug, but the soluble pigment is yellowish on the former, yellowish-green on the latter. Large differences are found in utilization of the carbon sources, lactose, mannitol and inositol. In view of these facts, strain No. 12090 was considered to be a new species and was designated Streptomyces cirratus nov. sp.

The species Streptomyces cirratus described herein includes all strains of streptomyces which form cirramycin and which cannot be definitely differentiated from the strain No. 12090 and its subcultures including mutants and variants. The properties of cirramycin are described herein and, after these properties are known, it is easy to differentiate the strains producing cirramycin from others.

Streptomyces cirratus when grown under suitable conditions produces cirramycin. A fermentation broth containing cirramycin is prepared by inoculating spores or mycelia of the cirramycin-producing organisms into a suitable medium and then cultivating under aerobic conditions. For the production of cirramycin, cultivation on a solid medium is possible, but for production in a large quantity cultivation in a liquid medium is preferable. The temperature of the cultivation may be varied over a wide range, 25–35° C. within which the organism may grow but a temperature of 25–30° C. and a neutral pH is preferred. In the submerged aerobic fermentation of the organism for the production of cirramycin, the medium contains as the source of carbon a commercially available glyceride oil or a carbohydrate such as glycerol, glucose, maltose, sucrose, lactose, dextrin, starch, etc. in pure or crude states, and as the source of nitrogen an organic material such as soybean meal, distillers solubles, peanut meal, cottonseed meal, meat extract, peptone, fish meal, yeast extract, corn steep liquor, etc., and, when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324 and in British Patents 730,341 and 736,325, and in United States Patents, 2,691,618, 2,658,018, 2,653,899, 2,586,762, 2,516,080, 2,483,892, 2,609,329 and 2,709,672. In aerated submerged culture an antifoam such as liquid paraffin, fatty oils or silicone is used. More than one kind of carbon source, nitrogen source or antifoam may be used for the production of cirramycin. Generally the cultivation is continued until at least several hundred mcg./ml. of cirramycin has accumulated in the medium. In some cases the broth pH decreased at the beginning and then gradually rose. The maximum potency was attained in a rather short period of time at about pH 7.4.

Fermentation conditions suitable for production of the antibiotic cirramycin were studied and the following composition of medium was found to be useful in shake culture: 1% peptone, 2.5% glucose, 0.1% $K_2HPO_4$, 0.1% NaCl, 0.05% $MgSO_4 \cdot 7H_2O$, 0.05% $CaCl_2$, 0.001% $ZnSO_4 \cdot 7H_2O$ and 0.2% yeast extracts.

A paper disc-agar plate assay using Bacillus subtilis as the test organism was employed for determination of antibiotic levels in fermentation broth or extracts. The inhibition zone was influenced considerably by the pH of the assay medium. The pH of the assay medium was standardized by adjusting to pH 8.0

Cirramycin may be isolated and purified in a variety of physical and chemical ways by utilizing the properties of cirramycin. For instance, by utilizing the different absorbability, solubility and distribution coefficient between the active compound and the contaminating impurities, cirramycin can be isolated. For example, cirramycin in broth filtrate can be extracted by lower aliphatic esters such as ethyl acetate and butyl acetate, chlorinated hydrocarbons such as methylene chloride and chloroform, ketones such as methyl isobutyl ketone, alcohols such as butanol and amylalcohol, ethers such as ethyl ether and other organic solvents which do not admix with water at weakly alkaline pH. Besides solvent extraction, cirramycin can be isolated from broth filtrate by absorbing it with active carbon or active alumina, and then eluting with acidic water or butanol. An effective method for the purification of cirramycin is a countercurrent distribution between acidic water and organic solvents which are miscible with water to a limited extent.

The following examples will serve to illustrate this invention without limiting it thereto.

EXAMPLE 1

| Constituents of medium: | Percent |
|---|---|
| Glucose | 2.5 |
| Peptone | 1.0 |
| Ext. yeast | 0.2 |
| Potassium phosphate, dibasic | 0.1 |
| Magnesium sulfate | 0.05 |
| Sodium chloride | 0.1 |
| Calcium chloride | 0.05 |
| Zinc sulfate | 0.001 |
| pH, 7.0. | |

A culture medium (30 l.) containing the above components was sterilized in a stainless steel tank of 50 liter volume, inoculated with a seed culture of *Sterptomyces cirratus*, and cultivated at 27±1° C. for 50 hours, whereupon the production of cirramycin in the fermentation broth reached to 120 mcg./ml. The beer was adjusted to pH 5.0 and filtered through diatomaceous earth (Dicalite) and the filtrate was adjusted to pH 8.0–8.2 and extracted twice with 15 l. and 7.5 l. butyl acetate. The extracts were combined and washed with 5 l. of water and then the activity was transferred to one-tenth the volume of dilute hydrochloric acid at pH 2.0. After being treated with a small amount of decolorizing carbon the aqueous extracts were adjusted to pH 8.0–8.2 and extracted again with ethyl acetate. The solvent extracts were combined, concentrated in vacuo and filtered. Upon the addition of ten volumes of petroleum ether to the concentrate a white amorphous precipitate appeared which was collected and dried to give 3 grams of cirramycin powder. The cirramycin thus obtained was subjected to paper chromatographic analysis using 1 molar phosphate buffer of pH 7.0 as a developing agent, and two components were recognized: one spot, with an R*f* value of 0.48, was derived from cirramycin A and the other, with an R*f* value of 0.15, was from cirramycin B.

EXAMPLE 2

Countercurrent distribution technique was applied to cirramycin powder, 1 g. obtained in Example 1 for the separation and purification of both components. Using a solvent system of benzene and 1/15 molar Sörensen's phosphate buffer of pH 5.8 in 50 transfers, cirramycin A and cirramycin B were found around tubes 5 and 42, respectively. Repeated distribution was made of the A-component in a system of benzene and pH 7.0 buffer and the activity peak was found at tube 25. Likewise, the B-component was again distributed between benzene and pH 4.5 buffer and the peak was found at tube 20 in a series of 50 tubes.

EXAMPLE 3

Both components, cirramycin A and B, separated in Example 2 were collected and recrystallized twice from hot ethanol in the form of free base to give white, crystalline cirramycin A, 299 mg., M.P. 123–124° C., and white needle-like crystals of cirramycin B, 295 mg., M.P. 228–229° C.

Both cirramycin A and B form white needle-like crystals which are readily soluble in methanol, ethanol, butanol, ethyl acetate, butyl acetate, chloroform, acetone, ethyl ether and benzene, slightly soluble in water and insoluble in petroleum ether.

Both cirramycin A and B are weak bases that react easily with mineral acids to form water-soluble salts. Included within the scope of the present invention are acid addition salts of cirramycin, and particularly nontoxic pharmaceutically acceptable acid addition salts, with organic and inorganic acids such as hydrochloric acid, sulfuric acid, hydrobromic acid, hydriodic acid, phosphoric acid, nitric acid, citric acid, maleic acid, malic acid, tartaric acid, benzoic acid, cinnamic acid, ascorbic acid, acetic acid, picric acid, phytic acid, levopimaric-6, 8a-ciscendosuccinic acid, sulfamic acid, glycolic acid and mandelic acid. For therapeutic purposes use is made of salts of nontoxic acids but salts of toxic acids, e.g., picric acid, are useful in isolation procedures, e.g., as precipitants from aqueous solutions, and for disinfectant purposes where toxicity is not important.

Cirramycin A melts at 123–124° C. and cirramycin B at 228–229° C. Their analytical data were as follows:

Cirramycin A, found: C, 64.15, 63.92; H, 8.89, 9.15; N, 2.75; cirramycin B, found: C, 61.57, 61.40; H, 8.40, 8.60; N, 2.01.

From these analytical data and the fact that macrolide antibiotics contain only one nitrogen atom the empirical and molecular formulae of cirramycin A and B are calculated to be as follows:

Cirramycin A—$C_{27}H_{45}NO_8$
Cirramycin B—$C_{36}H_{59}NO_{12}$

The antibiotics, A and B, are optically active: $[\alpha]_D^{20}=-20°$ and $-61°$ (c.=1.0, chloroform), respectively. The ultraviolet absorption spectra of cirramycin A and B in ethanol have a maximum at 240 mμ, the

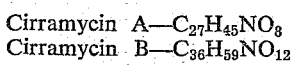

being 268 and 365 respectively. The infrared spectra are shown in FIGURES 1 and 2. Cirramycin A differs from cirramycin B in absorption bands of 1340, 1080 and 1000 cm.$^{-1}$.

Cirramycin A and B gave positive Fehling, Tollens and Molisch reactions. The orcinol reaction for pentose was positive on A and negative on B. The Seliwanoff reaction was negative on A and doubtful on B. Biuret, ninhydrin and ferric chloride tests were negative both on A and B.

When paper strip chromatography was carried out in various solvent systems, the following R*f* values were obtained: aqueous 5% ammonium chloride A, 0.73; B, 0.70, 80% benzene+20% methanol A, 0.66; B, 0.94, 1 M phosphate buffer of pH 7.0 A, 0.48; B, 0.15, 0.05 N ammonia saturated with methyl isobutyl ketone A, 0.84; B, 0.85, 1% aqueous ammonia A, 0.74; B, 0.78.

Aqueous solutions of cirramycin exhibit a high degree of stability over a wide pH range of 2.0 to 9.0 for 24 hours at 37° C.

*Percentage of Activity Remaining of Cirramycin and Erythromycin in Acidic Solution at 37° C.*

| pH | Cirramycin | | | | Erythromycin | | | |
|---|---|---|---|---|---|---|---|---|
| | 1.0 | 2.0 | 3.0 | 6.0 | 1.0 | 2.0 | 3.0 | 6.0 |
| Time: | | | | | | | | |
| 5 min_____percent__ | 94 | 94 | 100 | 100 | <10 | <10 | 91 | 100 |
| 30 min_____do____ | 89 | 94 | 100 | 98 | <10 | <10 | <10 | 95 |
| 1 hour_____do____ | 89 | 92 | 100 | 95 | <10 | <10 | <10 | 100 |
| 3 hours_____do____ | 95 | 94 | 98 | 100 | <10 | <10 | <10 | 98 |

ANTIMICROBIAL SPECTRUM

The minimum inhibitory concentration of cirramycin against a variety of micro-organisms was determined by by the serial dilution method, using blood agar for *Streptococcus pyogenes* and *Diplococcus pneumoniae*, glucose-peptone-yeast extract agar for lactic bacilli, nutrient agar for other bacteria and 2% glucose-Sabouraud agar for fungi. Cirramycin is highly active against Gram-positive bacteria and has less activity against Gram-negative bacteria. It is, however, inactive against staphylococci resistant to erythromycin or carbomycin. In view of the antibacterial pattern of this antibiotic, it appears that cirramycin belongs to the macrolide group of antibiotics.

Antibacterial Spectrum of Cirramycin

| Test Organisms | Minimum Inhibitory Concentration, mcg./ml. | | |
|---|---|---|---|
| | Cirramycin | Cirramycin A | Cirramycin B |
| Gram-negative: | | | |
| Escherichia coli NIHJ | 25 | 25 | 50 |
| Klebsiella pneumoniae Julianelle Type A | 25 | 25 | 50 |
| Salmonella typhi | 50 | 50 | 50 |
| Shigella dysenteriae | 12.5 | 12.5 | 12.5 |
| Pseudomonas aeruginosa | 50 | 25 | >50 |
| Gram-positive: | | | |
| Staphylococcus aureus FDA 209P | 0.39 | 0.39 | 0.39 |
| Staphylococcus aureus (SM-R) | 0.39 | 0.39 | 0.39 |
| Staphylococcus aureus (NB-R) | 12.5 | 12.5 | 6.25 |
| Staphylococcus aureus Smith strain | 0.78 | 0.78 | 1.56 |
| Staphylococcus aureus strain 193 (TC, PC-R) | 0.78 | 0.78 | 1.56 |
| Staphylococcus aureus (EM, CM-R) | >50 | >50 | >50 |
| Staphylococcus aureus (EM-R) | >50 | >50 | 6.25 |
| Staphylococcus aureus strain 52-34 (EM, CM-R) | >50 | >50 | 6.25 |
| Staphylococcus albus PCI 1200A | 0.78 | 0.78 | 0.78 |
| Microccus flavus | 0.19 | 0.19 | 0.39 |
| Sarcina lutea PCI 1001 | 0.19 | 0.19 | 0.19 |
| Diplococcus pneumoniae Type II | 0.39 | 0.39 | 0.19 |
| Streptococcus faecalis B-402-3 | 0.39 | 0.10 | 0.78 |
| Streptococcus hemolyticus | 3.12 | 3.12 | 3.12 |
| Lactobacillus casei ATCC 7469 | 0.19 | 0.19 | 0.19 |
| Hemophilus influenzae Shiga | 0.39 | 0.39 | 0.78 |
| Bacillus subtilis PCI 219 | 0.19 | 0.19 | 0.39 |
| Bacillus anthracis 115 | 0.39 | 0.39 | 0.78 |
| Bacillus mycoides strain O | 0.78 | 0.78 | 0.78 |
| Bacillus cereus ATCC 10702 | 0.39 | 0.78 | 0.39 |
| Bacillus sphericus strain 122 | 0.39 | 0.78 | 0.39 |
| Mycobacterium tuberculosis $H_{37}R_v$ | >50 | | |
| Mycobacterium 607 | >50 | | |
| Fungi: | | | |
| Aspergillus niger van Tieghem | >50 | | |
| Penicillium chrysogenum | >50 | | |
| Candida albicans | >50 | | |

Abbreviations: -R, resistant; SM, streptomycin; TC, tetracycline; PC, penicillin; NB, novobiocin; CM, carbomycin; EM, erythromycin.

TOXICITY AND IN VIVO ACTIVITY

The acute toxicity of cirramycin was determined in mice using subcutaneous and intravenous routes; the $LD_{50}$ values were found to be 347 mg./kg. and 131 mg./kg., respectively. No delayed toxicity was observed.

The in vivo activity of cirramycin was tested in mice against an experimental infection of Staphylococcus aureus, Smith strain. Mice were infected intra-peritoneally with 100 $LD_{50}$ of the pathogen and the antibiotic was administered subcutaneously or orally just after the bacterial challenge. A single subcutaneous $CD_{50}$ value of 8–10.0 mg./kg. and a single oral $CD_{50}$ of 200 mg./kg. were obtained. In a comparative test, subcutaneous and oral $CD_{50}$ values of erythromycin were found to be 5–7 mg./kg. and 40 mg./kg., respectively.

A number of antibiotics belonging to the macrolide group have been reported to date. They are colorless bases, active mainly against Gram-positive bacteria, have similar patterns of cross resistance, and contain one nitrogen atom in their empirical formula. Another characteristic is specific absorption in the ultraviolet region. Most of the macrolide group antibiotics are divided roughly into four classes by their predominant peak in the ultraviolet absorption spectra, namely, 225 mμ class: pikromycin, methymycin, narbomycin, amaromycin.
230 mμ class: spiramycin, leucomycin, tetiomycin, miamycin.
240 mμ class: carbomycin, angolamycin.
285 mμ class: erythromycin, oleandomycin, tylosin.

According to this classification, cirramycin belongs to the 240 mμ class of the macrolide group along with carbomycin and angolamycin. Characteristic absorption peaks at 1690 and 1623 cm.$^{-1}$ in the infrared spectra of cirramycin A and B are assigned to an α,β-unsaturated ketone, and the strong peak at 1728 cm.$^{-1}$ must arise from the ester or lactone carbonyl function in the molecule. These absorptions are also found in the IR spectra of carbomycin and angolamycin with similar relative intensity. Comparative studies were therefore made on the producing organism, physico-chemical properties and paper chromatography with carbomycin and angolamycin.

Streptomyces cirratus, the producer of cirramycin, differs from S. halstedii, the carbomycin producer, and S. eurythermus, the angolamycin producer, as follows:

S. halstedii: Differences are observed in mycelial color on synethetic and starch agar, and on potato plug. Aerial mycelium is not observed on glucose asparagine and starch agar.

S. eurythermus: The strain has gray aerial mycelium, and produces broom-shaped sporophores. Brown or dark brown soluble pigment is produced both on synthetic and organic media.

Melting points, nitrogen contents, optical activities and extinction values $$(E_{1cm.}^{1\%})$$

at 240 mμ of these antibiotics are as follows:

Comparison of Cirramycin A and B With Carbomycin and Angolamycin

| | Cirramycin A | Cirramycin B | Carbomycin | Angolamycin |
|---|---|---|---|---|
| Melting Point, °C | 123-124 | 228-229 | 210-214 | 134-136 / 165-168 |
| Nitrogen Content | 2.75 | 2.01 | 1.78 | 1.40-1.45 |
| $[\alpha]_D$ | −20° ($CHCl_3$) | −61° ($CHCl_3$) | −54±2° (MeOH) | −64° ($CHCl_3$) |
| $E_{1cm.}^{1\%}$ at 240 mμ | 268 | 365 | 185 | 142 |
| Empirical Formula | $C_{37}H_{46}NO_8$ | $C_{36}H_{50}NO_{12}$ | $C_{41-42}H_{67-69}NO_{16}$ | $C_{55-57}H_{87-91}NO_{18}$ |

In infrared absorption spectra, cirramycin A differs from carbomycin at 1320, 1300, 1280, 1240, 1080, 1010, 900 and 860 cm.$^{-1}$, and from angolamycin at 1320, 1190, 1160, 1080, 1010, 1000 and 990 cm.$^{-1}$. Cirramycin B differs from carbomycin at 1340, 1315, 1300, 1280, 1240, 1190, 1025, 1000, 990 and 980 cm.$^{-1}$, and from angolamycin 1340, 1190, 1120, 1010 and 990 cm.$^{-1}$.

The following solvent systems are found to be useful in distinguishing between different macrolide antibiotics:

System M-1: aqueous 5% ammonium chloride
System M-2: 80% benzene and 20% methanol
System M-3: 1 M phosphate buffer of pH 7.0
System M-4: 0.05 N (0.175%) ammonia saturated with methyl isobutyl ketone (MIBK)
System M-5: 1% aqueous ammonia
System M-6: 1% ammonia saturated with MIBK With these systems, an ascending method with 18–20 cm. development is used. Rf values of cirramycin A and B, carbomycin and angolamycin in the above six solvent systems are as follows:

Rf Values

|  | Cirra-mycin A | Cirra-mycin B | Carbo-mycin | Angola-mycin |
|---|---|---|---|---|
| System M-1 | 0.73 | 0.70 | 0.63 | 0.75 |
| System M-2 | 0.66 | 0.94 | 0.92 | 0.88 |
| System M-3 | 0.48 | 0.15 | 0.14 | 0.26 |
| System M-4 | 0.86 | 0.60 | 0.53 | 0.48 |
| System M-5 | 0.74 | 0.78 | 0.30 | 0.49 |
| System M-6 | 0.84 | 0.85 | 0.52 | 0.71 |

Cirramycin is a useful agent for the treatment of mastitis in cattle or calf scours; for this purpose use is made, for example, of suspensions in vegetable oil for instillation in the teats to treat mastitis, containing 1 to 1000 mgm./ml., and preferably about 50 mgm., of the antibiotic, or enough capsules to provide a total dosage of 0.25 to 2.0 grams by oral administration as for calf scours.

When desired for specific purposes and rendered pharmaceutically compatible, there may be admixed with the compounds of the present invention, other medicaments such as antihistamines, sulfa drugs (e.g., sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4 - dimethylbenzoylsulfanilamide, benzylsulfanilamide and N' - 2 - (2-quinoxalyl) sulfanilamide, liptropic agents (particularly methionine, choline, inositol and beta-sitosterol and mixtures thereof), stimulants of the central nervous system (e.g., caffeine, amphetamines), local anesthetics, analgesics (e.g., aspirin, salicylamide, sodium gentisate, p-acetylaminophenol, phenacetin, codeine), sedatives (e.g., barbiturates, bromides), salts of penicillin (e.g., potassium penicillin G, procaine penicillin G, 1-ephenamine penicillin G, dibenzylamine penicillin G, other salts disclosed by U.S. Patent 2,627,491; these combinations are particularly useful to enable variation of the pattern of blood levels obtained), phenoxymethylpenicillin, phenethicillin, methicillin, oxacillin and other synthetic penicillins and salts thereof, other antibiotic agents (e.g., streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cycloserine, neomycin, kanamycin; in some cases such combinations attack a wider range of organisms or show synergistic efficacy or provide decreased toxicity with equal efficacy), vitamins (e.g., vitamins A, $A_1$, $B_1$, $B_2$, $B_6$, $B_{12}$ and members of that family, folic acid and members of that family, vitamins C, $D_2$, $D_3$ and E), hormones (e.g., cortisone, hydrocortisone, 9-α-fluorocortisone, 9-α-fluorohydrocortisone, prednisone and prednisolone), anabolic agents (e.g., 11,17-dihydroxy-9-α-fluoro-17-α-methyl-4-androsten-3-one; 17-α-ethyl - 19-nortestosterone) and antifungal agents (e.g., mycostatin).

The antibiotic of the present invention is a useful agent for the detection of contamination by Gram-negative bacteria, fungi, yeasts and the like in the course of the commerical production of the enzymes streptokinase and streptodornase by the growth of streptococci and the production of amylase by fermentation of *B. subtilis* or *B. cereus*. Thus, the addition of 1 to 1000 mcg./ml., and preferably about 10 mcg./ml., of the antibiotic to an aliquot of inoculated medium followed by incubation, permits the growth of undesirable contaminants and their visual detection.

We claim:

1. An antibiotic substance effective in inhibiting the growth of Gram-positive bacteria which is selected from the group consisting of a basic substance, cirramycin A, which is soluble in methanol, ethanol, butanol, ethyl acetate, butyl acetate, chloroform, acetone, diethyl ether and benzene and slightly soluble in water and insoluble in petroleum ether and capable of forming salts with acids, which gives positive Fehling, Tollens and Molisch reactions, a positive orcinol reaction and negative biuret, ninhydrin and ferric chloride reactions, and which in purified form melts at 123–124° C., exhibits $[\alpha]_D^{20}$ of $-20°$ (c.=1.0, $CHCl_3$), exhibits in ethanol an ultraviolet absorption spectra having a maximum at 240 mμ, $$E_{1\,cm}^{1\%} \text{ at } 240 \text{ millimicrons} = 268$$

has the following average elemental analysis: C, 64.04%; H, 9.02%; N, 2.75% and O (by difference) 24.19%; and when pelleted in potassium bromide exhibits characteristic absorption in the infra-red region of the spectrum as shown in FIGURE 1; and acid addition salts of said basic substance, and a basic substance, cirramycin B, which is soluble in methanol, ethanol, butanol, ethyl acetate, butyl acetate, chloroform, acetone, diethyl ether and benzene and slightly soluble in water and insoluble in petroleum ether and capable of forming salts with acids, which gives positive Fehling, Tollens and Molisch reactions, a negative orcinol reaction and negative biuret, ninhydrin and ferric chloride reactions, and which in purified form melts at 228–229° C., exhibits $[\alpha]_D^{20}$ of $-61°$ (c.=1.0, $CHCl_3$), exhibits in ethanol an ultraviolet absorption spectra having a maximum at 240 mμ, $$E_{1\,cm}^{1\%} \text{ at } 240 \text{ millimicrons} = 365$$

has the following average elemental analysis: C, 61.49%; H, 8.50%; N, 2.01%; and O (by difference) 28.00%; and when pelleted in potassium bromide exhibits characteristic absorption in the infra-red region of the spectrum as shown in FIGURE 2; and acid addition salts of said basic substance.

2. An antibiotic substance effective in inhibiting the growth of Gram-positive bacteria which is a basic substance, cirramycin A, which is soluble in methanol, ethanol, butanol, ethyl acetate, butyl acetate, chloroform, acetone, diethyl ether and benzene and slightly soluble in water and insoluble in petroleum ether and capable of forming salts with acids, which gives positive Fehling, Tollens and Molisch reactions, a positive orcinol reaction and negative biuret, ninhydrin and ferric chloride reactions, and which in purified form melts at 123–124° C., exhibits $[\alpha]_D^{20}$ of $-20°$ (c.=1.0, $CHCl_3$), exhibits in ethanol an ultraviolet absorption spectra having a maximum at 240 mμ, $$E_{1\,cm}^{1\%} \text{ at } 240 \text{ millimicrons} = 268$$

has the following average elemental analysis: C, 64.04%; H, 9.02%; N, 2.75% and O (by difference) 24.19%; and when pelleted in potassium bromide exhibits characteristic absorption in the infra-red region of the spectrum as shown in FIGURE 1.

3. An antibiotic substance effective in inhibiting the growth of Gram-positive bacteria which is a basic substance, cirramycin B, which is soluble in methanol, ethanol, butanol, ethyl acetate, butyl acetate, chloroform, acetone, diethyl ether and benzene and slightly soluble in water and insoluble in petroleum ether and capable of forming salts with acids, which gives positive Fehling, Tollens and Molisch reactions, a negative orcinol reaction and negative biuret, ninhydrin and ferric chloride reactions, and which in purified form melts at 228–229° C., exhibits $[\alpha]_D^{20}$ of $-61°$ (c.=1.0, $CHCl_3$), exhibits in ethanol an ultraviolet absorption spectra having a maximum at 240 mμ, $$E_{1\,cm}^{1\%} \text{ at } 240 \text{ millimicrons} = 365$$

has the following average elemental analysis: C, 61.49%; H, 8.50%; N, 2.01%; and O (by difference) 28.00%; and when pelleted in potassium bromide exhibits characteristic absorption in the infra-red region of the spectrum as shown in FIGURE 2.

4. An acid addition salt of cirramycin A, as defined in claim 1.

5. An acid addition salt of cirramycin B, as defined in claim 1.

6. The process for the production of an antibiotic substance, designated cirramycin, which comprises cultivating a strain of *Streptomyces cirratus* in an aqueous carbohydrate solution containing a nitrogenous nutrient under submerged aerobic conditions until substantial activity versus Gram-positive bacteria is imparted to said solution and then recovering said cirramycin from said solution.

7. The process of claim 6 in which the organism is *Streptomyces cirratus*, A.T.C.C. 14699.

8. A process according to claim 6 wherein the antibiotic cirramycin is separated from the fermentation broth by extraction of said antibiotic with a water-immiscible solvent in which said antibiotic is soluble.

9. A process, according to claim 6 wherein the antibiotic cirramycin is separated from the fermentation broth by extraction of said antibiotic into a water-immiscible solvent in which said antibiotic is soluble followed by evaporation of said solvent.

10. A process according to claim 9 wherein the water-immiscible solvent is selected from the group consisting of aliphatic esters, chlorinated hydrocarbons, aliphatic ketones, aliphatic alcohols and aliphatic ethers.

No references cited.